United States Patent [19]

Dawson et al.

[11] 4,000,118
[45] Dec. 28, 1976

[54] COLORINGS

[75] Inventors: Daniel J. Dawson, Mountain View, Calif.; Josef Rudinger, Zurich, Switzerland

[73] Assignee: Dynapol, Palo Alto, Calif.

[22] Filed: Feb. 11, 1975

[21] Appl. No.: 548,930

Related U.S. Application Data

[62] Division of Ser. No. 420,545, Nov. 30, 1973, Pat. No. 3,920,855.

[52] U.S. Cl. .................. 260/79.5 C; 8/41 R; 8/DIG. 7; 260/37 P; 260/46.5 E; 260/79.3 R; 260/79.5 NV; 260/144; 426/250; 426/540; 536/51; 536/56

[51] Int. Cl.$^2$ .......... A23L 1/27; C08F 28/02

[58] Field of Search ........... 260/79.3 R, 79.5 NV, 260/79.5 C, 144, 46.5 E, 37 P, 212, 209 D; 8/41 R, DIG. 7, 3

[56] References Cited

UNITED STATES PATENTS

| 3,096,322 | 7/1963 | Straley et al. | 260/204 |
|---|---|---|---|
| 3,108,846 | 10/1963 | Utmuneratya et al. | 260/144 |
| 3,137,671 | 6/1964 | Bosshard et al. | 260/37 |
| 3,190,850 | 6/1965 | Burke | 260/38 |
| 3,277,075 | 10/1966 | Mayhew et al. | 260/144 |
| 3,304,297 | 2/1967 | Wegmann et al. | 260/144 |
| 3,337,288 | 8/1967 | Horiguchi et al. | 260/144 |
| 3,345,122 | 10/1967 | Meininger et al. | 260/144 |
| 3,507,850 | 4/1970 | Cohen et al. | 260/144 |
| 3,563,931 | 2/1971 | Horiguchi et al. | 260/144 |
| 3,640,733 | 2/1972 | Rust et al. | 426/177 |

FOREIGN PATENTS OR APPLICATIONS

| 645,458 | 9/1964 | Belgium | 8/41 |

*Primary Examiner*—Ronald W. Griffin

[57] ABSTRACT

Nontoxic coloring compositions which comprise optically chromophoric groups attached via sulfonamido linkages to nondegradable chemical molecules having molecular dimensions which substantially prevent their absorption from the gastrointestinal tract are disclosed. The colorings find primary applications as food colors.

11 Claims, No Drawings

NONTOXIC COLORING COMPOSITIONS

This is a division of application Ser. No. 420,545, filed Nov. 30, 1973, now U.S. Pat. No. 3,920,855, issued Nov. 18, 1975.

BACKGROUND OF THE INVENTION

1. Field of the Invention

The present invention relates to colorings. More particularly, it relates to a class of colorings that are useful as food colorings and that in that use are characterized by having substantially reduced toxicity.

2. The Prior Art

Colorings are widely used in the food industry to enhance and improve the appearance and appeal of virtually all the processed foods now marketed. There is, however, a growing concern that food colorings present health hazards. The United States Food and Drug Administration has recently restricted or banned several widely used food colorings, for example, Food, Drug and Cosmetic Red. No. 4 and FD&C Violet No. 1, as unsafe. A direct and self-evident solution to the color toxicity problem is to discover and employ colorings which, when ingested and absorbed into the body, have no ill effects. It has proved most difficult to do this and supply the wide range of colors desired by the food processing industry.

An indirect solution to the food color toxicity problem has also been proposed. It has been noted that if a food color has a molecular size which is too great to permit the color to pass through the walls (the mucosal linings) of the gastrointestinal tract, the food color will not be absorbed into the body and there is no possibility of toxicity. Conventional food colors themselves are not large enough to prevent absorption. It is thus necessary to chemically bind together a plurality of color bodies (also known as optical chromophores or optically chromophoric groups or bodies) or to chemically attach the color bodies to a molecule sufficiently large to restrict absorption. The means for chemically attaching chromophores to a large "carrier" molecule must meet certain stringent criteria. It must not interfere with the optical color properties of the chromophores. It also must not break down, i.e., hydrolyze, metabolize, or degrade, at either the conditions of food processing or the conditions of the gastrointestinal tract.

STATEMENT OF THE INVENTION

It has now been found that the sulfonamido linkage is especially well suited for attaching optically chromophoric groups to molecules of nonabsorbable size. Thus, in accordance with this invention, an improved coloring, most useful as a nonabsorbable food coloring, is provided which comprises one or more optically chromophoric groups attached through sulfonamido linkages to a molecule which is too large to be absorbed through the walls of the gastrointestinal tract. These colorings are depicted by the formula

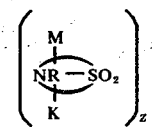

wherein M is a nondegradable chemical group, molecule or molecular backbone of a molecular size and structure which substantially prevents its passage and absorption through the mucosal lining of the gastrointestinal tract,

is a sulfonamido linkage in which R is hydrogen or hydrocarbon of up to about 6 carbon atoms, K is an optically chromophoric group and Z is a positive integer, i.e., one or greater. The sulfamido linkage is stable and not subject to rupture under the conditions of food processing or the digestive tract. It does not interfere, to any observable degree, with the color-imparting properties of a spectrum of optical chromophores.

DETAILED DESCRIPTION OF THE INVENTION

The Sulfonamido Linkages

The colors of the present invention contain sulfonamido linkages, that is

linkages, also known as sulfamyl linkages. R may be hydrogen or it may be hydrocarbon. Hydrogen is preferred because of simplicity, but, if desired, aliphatic, cycloaliphatic or even aromatic hydrocarbon R's such as methyl, isopropyl, n-propenyl, cyclohexyl, phenyl or xylyl may be employed. Generally, hydrocarbon R's should contain not more than about 6 carbons to ensure that they do not interfere with the chromophoric groups. It should be possible in some cases, however, to use larger hydrocarbon R's or R's containing hereroatom substitution, if desired.

The sulfonamido linkage attaches optically chromophoric groups to a chemical group or backbone to prevent absorption of the chromophoric groups. The linkage may go in either direction. That is, the NR end of the linkage may be attached either to the backbone or the chromophore. Thus the polymer product may assume a

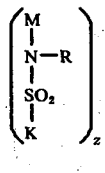

structure or a

structure. It is possible, and in fact preferred, for the SO₂ portion of the sulfonamido group to be a part of the chromophore.

The Chromophores

Chromophores or active color centers are incorporated in the present colors, being bound thereinto by sulfonamido groups. A variety of chromophores may be incorporated, including the chromophores known to the art for food coloring purposes in their uncombined state and chromophores not previously suggested for food coloring purposes because of toxicity in an uncombined state. The latter materials are now usable as food colors since they are rendered nonabsorbable and hence nontoxic when incorporated in the present colors. One of a plurality of different chromophores may be employed in a single polymeric coloring. A total of Z chromophores is employed. Z is 1 or greater and preferably is from 10 to 5,000, more preferably from 50 to 4,000.

Exemplary chromophores include azo dyes, especially monoazo dyes which in their uncombined monomeric state are sulfonate salts such as Food Drug and Cosmetic (FD&C) Yellow No. 6, commonly known as Sunset Yellow

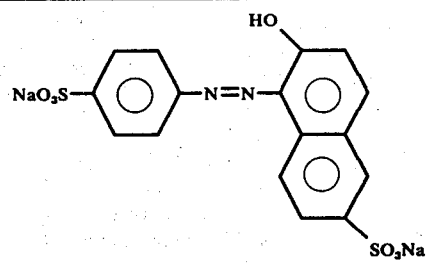

Yellow No. 6

FD&C Yellow No. 5 (Tartrazine)

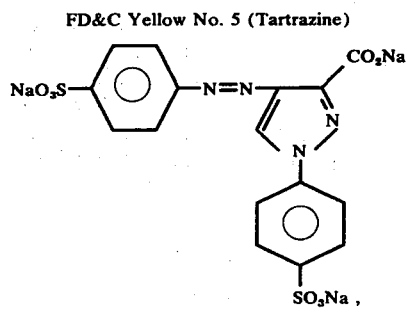

FD&C Red No. 2 (Amaranth)

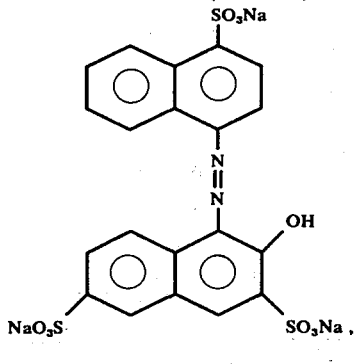

FD&C Red No. 4

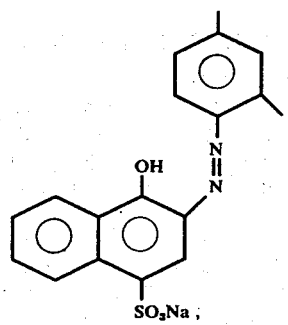

FD&C Red No. 40

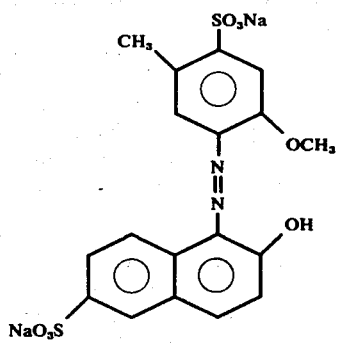

and Orange B

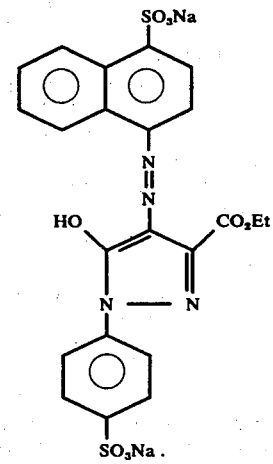

Other exemplary chromophores include indigoid dyes such as FD&C Blue No. 2

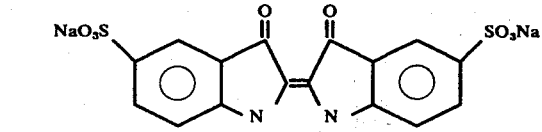

and triphenylmethane dyes such as

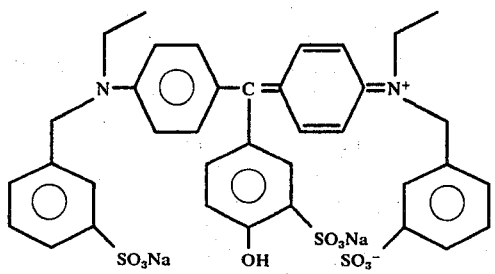
FD&C Green No. 3,

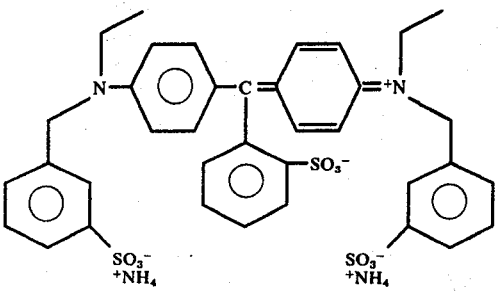
FD&C Blue No. 1,

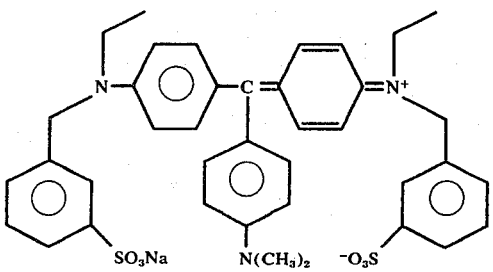
FD&C Violet No. 1,

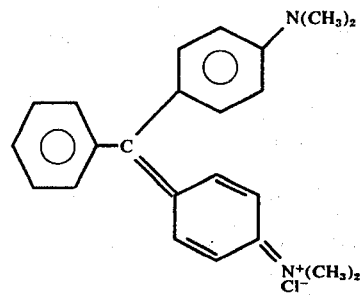
Malachite Green,

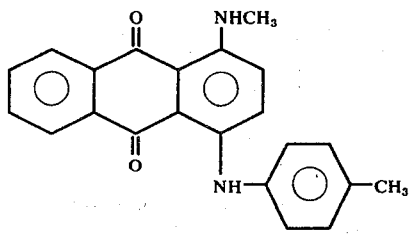
Sudan Blue, and

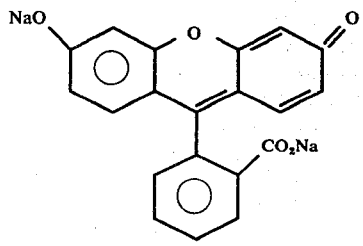
Uranine (Fluorescein).

Preferred among the chromophoric groups are those which exist as sulfonate salts in their monomeric, uncombined state; and preferred among these are azo chromophoric groups which exist as sulfonate salts, especially monoazo optical chromophores which exist as sulfonate salts.

The Chemical Backbone

In the coloings of this invention, chromophoric groups are attached through sulfonamido linkages to a nondegradable chemical group or backbone. To ensure non-toxicity, this nondegradable chemical group or backbone must be large enough that the final coloring product of chromophore and backbone is too large to pass through the mucosa of the gastrointestinal tract. This result is generally achieved when the nondegradable backbone has at least two carbon atoms and the final food coloring product has a molecular weight of at least 1,000. It is preferred to have backbones of molecular weight of at least 10,000 and most preferably from about 20,000 to about 1,000,000, and final product molecular weights of from about 20,000 to about 2,000,000.

The backbones or chemical groups to which the chromophores are attached via sulfonamido linkages are polymers, especially organic polymers. They are preferably linear organic polymers such as polyacrylic acid, but may contain branchings, such as in the case of polyethyleneimine and substituents. In cases where it is desired to have substantial water solubility of colorings, such as at least 1,000 ppm wt. solubility in water, backbones and/or chromophores having hydrophilic polar groups such as ether, hydroxyl, carboxyl, amino and sulfonate groups and the like are preferred. Generally, adequate water solubility is achieved when 10% or greater of the backbone or chromophor carbons carry a hydrophilic polar group. Conversely, in cases where it is desired to increase the oil or fat solubility of colorings, non-polar oleophilic groups such as hydrocarbon chains may be added, especially to ensure that less than 10% of the carbons contain polar groups. The backbones must not undergo degradation, digestion, or metabolism under the conditions of food preparation or under the conditions of the gastrointestinal tract.

Exemplary materials for use as backbones in the colorings of this invention include polyacrylic acid, polyethyleneimine (both linear and branched), poly-2 or 4-vinylpiperidine, polybuteneamine, polyvinylalcohol, polyvinyl-(3-aminopropyl)-ether, cyclopolydiallylamine, poly-2-aminoethylmethacrylate, polyvinyl-(2-aminoethyl)-ether, polyacrolein, poly-2-amino-1-vinylethanol, polyepichlorohydrin, polysiloxanes and copolymers of any of the above. Particularly useful are polyvinylamine, polyvinylalcohol, and polyacrylic acid. Also, naturally occuring polymers such as cellulose and dextran and the 2-aminoethyl derivatives of these polymers may be employed.

The present colorings are prepared by a variety of processes. When the chromophoric groups are to be constructed on a pre-existing amine-containing polymer, the polymer is treated with N-acetylsulfanilyl chloride, 4-acetamido-1-naphthalenesulfonyl chloride, or any other aromatic sulfonyl chloride bearing a protected amino group. The resultant sulfonamide polymer is hydrolyzed in either acid or base to free th aromatic amino group which may be subsequently diazotized and coupled to a great variety of coupling agents. The coupling agent may be any aromatic compound, carbocyclic or heterocyclic, bearing a hydroxy, alkoxy, amino, monoalkylamino or dialkylamino group on an aromatic ring. Usually, the coupling agent is a phenol, aniline, naphthol, naphthylamine, or pyrazolone derivative. Most often the coupling agent is a naphthol, either sulfonated or not, or a pyrazolone.

Alternately, an N-vinyl-N-alkylsulfonamido group can be constructed on an aromatic amine, which is then polymerized and diazotized-coupled, in either order.

The colorings of the present invention find primary applications as food colorings. In such applications they are admixed in an effective, color-inducing amount with a foodstuff or a foodstuff precursor. Generally it is required to add from about 1 to about 20,000 parts per million of coloring on a weight basis to achieve desired color levels. The colorings are not absorbed by the body and thus have no nutritive food value.

The colorings also find use in other applications. They can be used as vat dyes and find a specialized application as dyes for biological sample preparation, since their high molecular weight prevents their passage through sound cell walls but permits selective passage through unsound (lysed) cell walls.

The colorings of this invention and their preparation are further described by the following Examples and comparative experiments. These are provided for purposes of illustration and are not to be construed as limiting the scope of the invention.

EXAMPLE I

A. A 15 g portion of polyacrylic acid is dissolved in 75 ml of concentrated sulfuric acid with stirring at room temperature for 40 minutes. The polyacrylic acid solution is then stirred at 40° C while 140 ml of 2.15 M hydrazoic acid (HN₃) in benzene is added dropwise with stirring over a period of 4.5 hours. The reaction, a Schmidt rearrangement, is continued at 40° C for about 14 hours. The mixture is then stripped of benzene to give an almost clear yellow solution, which is cooled to 5° C. Methanol (150 ml) is then added. The resulting emulsion is centrifuged at high speed for 30 minutes to separate the precipitate. The precipitate is dissolved in 50 ml of water and gives a yellow solution. This solution is precipitated by addition to methanol, the precipitate being once again dissolved and precipitated a third time for purification. 12.06 Grams of a white solid are recovered. Elemental analysis shows this product to be a copolymer of acrylic acid (mole ratio 0.46) and vinylamine (mole ratio 0.54).

B. 10 Grams of the product of Part A are dissolved in 35 ml of water. An 11% solution of sodium hydroxide is then dripped in to a pH of 9. 28.5 Grams of N-acetylsulfanilyl chloride is added in small portions over a period of 5.5 hours. The pH of the solution is increased throughout the addition in order to keep the polymer in solution, gradually increasing from an initial pH of about 9 to a final pH of about 12.5. After completing the addition of N-acetylsulfanilyl chloride, conditions are maintained constant for 1 hour and then the cloudy yellow solution which results is filtered. The resulting clear yellow solution is dripped into a stirred 25% solution of acetic acid to give a white precipitate, which is collected, rinsed with water, and dried in vacuo to give 20.8 g of a white powder.

18.7 Grams of the white powder is suspended in 75 ml of 10% aqueous hydrochloric acid, and this mixture is heated at reflux with stirring under argon for 1 hour (to hydrolyze the N-acetyl group). A clear yellow solution results. This solution is cooled to about 50° C and dripped warm into an aqueous solution of sodium acetate in an ice bath. The resulting slurry is filtered and washed with dilute aqueous acetic acid (pH3). After drying in vacuo, 11.5 g of a fine white powder is recovered, which upon NMR analysis is shown to be the following polymeric sulfanilamide

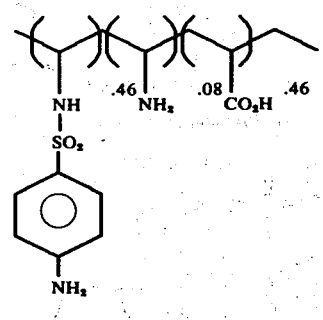

C. 2.975 Grams of the polysulfanilamide product of Part B is dissolved in 45 ml of 10% hydrochloric acid and 200 ml of water with stirring. 1.0 N aqueous sodium nitrite solution (11.0 ml) is added to give a dark yellow solution, which is then dripped gradually into a solution of 2.46 g of Schaeffer's salt in 67 ml of 10% aqueous sodium hydroxide and 90 ml of water, while stirring in an ice bath. The resulting deep red solution is stirred in the ice bath for 30 minutes, treated with 10% aqueous hydrochloric acid to a pH of 2 to yield an orange suspension which is centrifuged. The separated solids are purified by dialysis to yield 4.4 g of an intense orange dye having a color almost indistinguishable from that of Sunset Yellow (FD&C Yellow No. 6). Analysis showed that this dye has the following structure

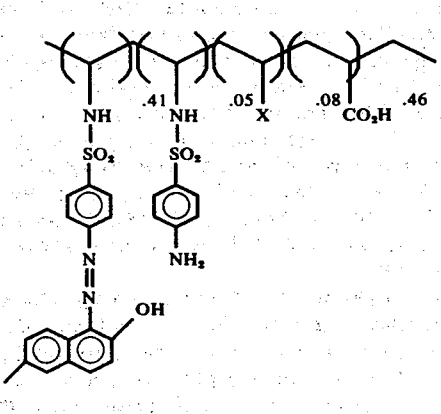

where X is $NH_2$ or OH. This color may be used to color orange soda by adding 300 ppm (basis water weight) of the color to a solution of orange flavor and carbonating.

EXAMPLE II

The preparation of polysulfanilamide in accord with parts A and B of Example I is repeated, the product differing from the product of Example I only in insignificant variations in molar ratios.

1.0 Grams of the above product is dissolved in 10 ml of 10% aqueous hydrochloric acid and 40 ml of water to yield a clear yellow solution. This solution is stirred at room temperature while 2.48 ml of a 1.0 N aqueous sodium nitrite solution is added. This solution is then added over a period of 5 minutes to a solution of 738 mg of Pyrazolone T,

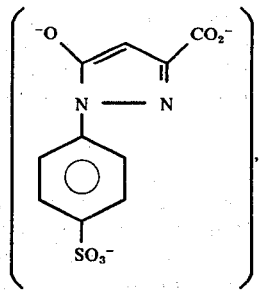

in 15 ml of 10% aqueous sodium hydroxide and 20 ml of water while stirring in an ice bath. A deep red solution results. This solution is acidified with 10% hydrochloric acid. At pH 2 a yellow-orange precipitate forms, which is separated and purified by dialysis. This product is dried and upon analysis found to be the following polymeric coloring

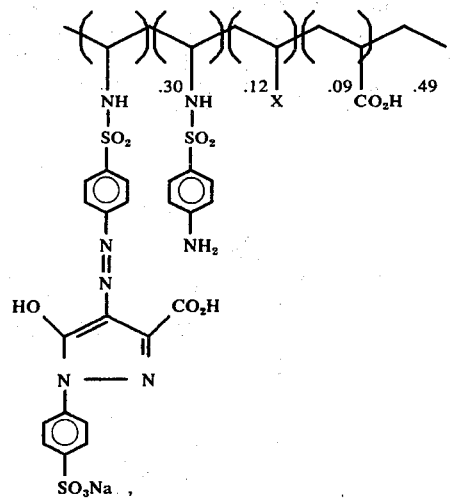

wherein X is $NH_2$ or OH. This coloring is virtually indistinguishable in color properties from Tartrazine — FD&C Yellow No. 5,

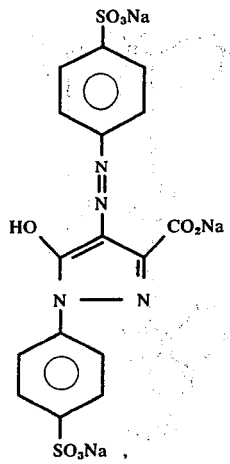

and like Tartrazine, may be used to color lemon-flavored gelatin.

EXAMPLE III

A. Polyscience Corp.'s commercial branched polyethyleneimine of molecular weight 1200 is treated in accordance with the general procedures of parts A and B of Example I with N-acetylsulfanilyl chloride in aqueous base and hydrolyzed to yield a polymeric sulfanilamide

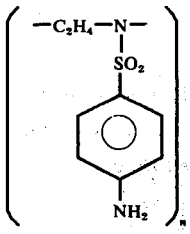

B. 209 Mg of the sulfanilamide of Part A is dissolved in 1.5 ml of 10% HCl and 5 ml of $H_2O$ and diazotized with 0.16 ml of 5.8 M aqueous sodium nitrite and then added to 13.8 ml of a solution of 1.0 g of 8-amino-1-naphthol-3,6-disulfonic acid,

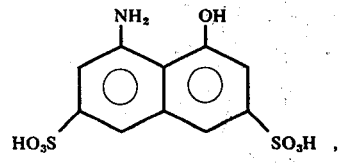

in 10 ml of 10% sodium hydroxide and 40 ml of $H_2O$. The resulting solution is deep purple. It is neutralized with hydrochloric acid and purified. The product has the chemical formula

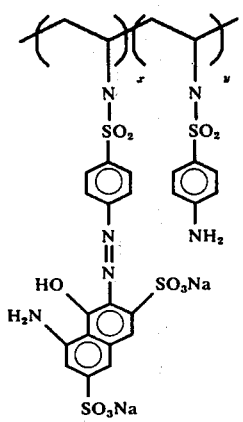

and is useful as a burgundy food coloring.

EXAMPLE IV

The preparation of Example I is repeated with three modifications:

1. The copolymer of acrylic acid and vinylamine is reacted with 4-acetamido-1-naphthalenesulfonyl chloride instead of with N-acetylsulfanilyl chloride;

2. The diazotization of polymeric sulfanilamide with acidic sodium nitrite (i.e., $HNO_2$), is carried out for five minutes instead of 15 minutes; and 3. Instead of Schaeffer's salt, 2-naphthol-3,6-disulfonic acid (R acid) is employed as the final coupling reagent.

The product of this preparation is recovered. It substantially matches th color of Amaranth and has the following chemical structure:

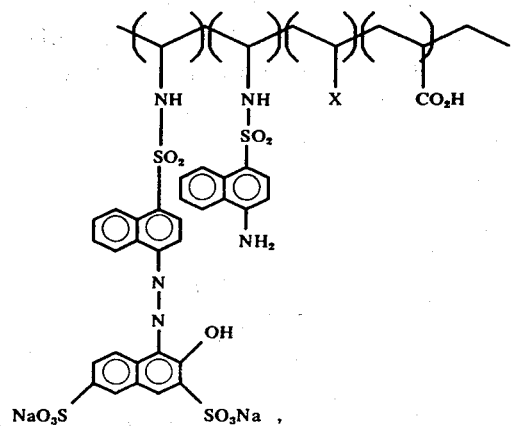

wherein X is $NH_2$ or OH.

Amaranth

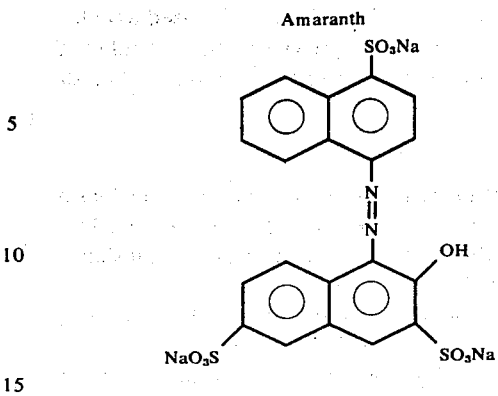

EXAMPLE V

10 Grams of $N^4$-acetyl-$N^1$-methyl-sulfanilamide is dissolved in 125 ml of 3% aqueous sodium hydroxide in a pressure bomb. The bomb is charged with 100 psi of acetylene gas and rocked gently at 150° for 10 hours, adding acetylene during the reaction to maintain the pressure. The product, $N^4$-acetyl-$N^1$-methyl-$N^1$-vinyl-sulfanilamide, is collected by filtration, washed with aqueous base, acid, and water, and dried to give 6.84 g of a white powder.

A 6.0 g portion of the above product is dissolved in 150 ml dry methylene chloride, cooled to −20°, and treated with 0.1 ml boron trifluoride etherate. After 20 hours, filtration of the reaction mixture affords 4.1 g of poly-$N^1$-methyl-$N^1$-vinyl-$N^4$-acetylsulfanilamide. This material is heated at reflux with 10% aqueous hydrochloric acid for one hour. Precipitation of the hot reaction mixture into cold aqueous sodium acetate results in a white slurry which is collected by filtration, washed and dried to give 3.4 g of poly-$N^1$-methyl-$N^1$-vinyl-sulfanilamide.

2.0 Grams of the above-prepared polysulfanilamide is dissolved in 100 ml of 2% aqueous hydrochloric acid, diazotized by treatment with 11.0 ml of 1.0 M aqueous sodium nitrite and, after the pale yellow solution has been stirred at room temprature for 15 minutes, it is slowly added to a solution of 3.40 g of 1,8-dihydroxyaphthalene-3,6-disulfonic acid in 50 ml of 6% aqueous sodium hydroxide to give a deep violet solution. Precipitation of the product polymeric dye below pH 2.0, followed by dialysis and isolation, affords 4.5 g of a burgundy polymeric dye with the structure given below.

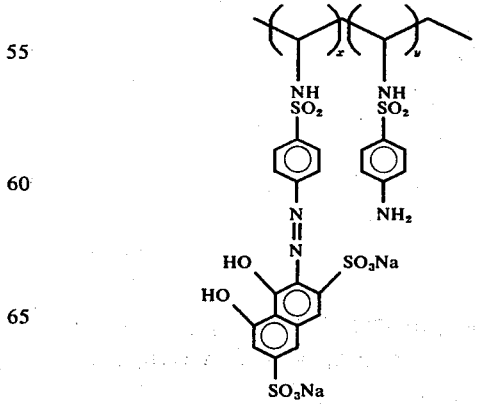

EXAMPLE VI

The preparation of Example I is repeated with one variation. Instead of the 10,000 MW polyacrylic acid employed in Example I, a higher molecular weight polyacrylic acid, obtained from Polysciences, Inc. and having a molecular weight determined by gel permeation chromatography to be 134,000, is employed. The final product has the same color properties as the final product of Example I and has a molecular weight estimated by gel permeation techniques to be 300,000 to 400,000.

EXAMPLE VII

The preparation of Example I is repeated with the following changes:

A. Only 70 ml of 2.15 M hydrazoic acid in benzene is added. This causes the initial copolymer ratios to be 0.59 for acrylic cid and 0.41 for vinylamine. The yield is 10.2 grams.

B. Only 15 grams of N-acetylsulfanilyl chloride is added during the reaction. The product is hydrolyzed in refluxing 10% aqueous hydrochloric acid as in Example I to yield 8.2 g of a polymeric sulfanilamide with the following mole ratios:

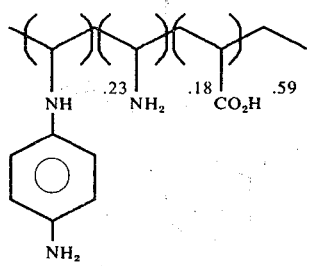

C. Diazotization and coupling of a 2.98 g sample as in Example I results in 3.48 g of an orange polymeric dye. The resulting final product is very similar to the product of Example I varying only in that it contains about 0.17 molar equivalents of the chromophore instead of 0.41, 0.06 molar equivalent of residual sulfanilamide instead of 0.05, and 0.59 molar equivalent of acrylic acid instead of 0.46.

EXAMPLE VIII

The preparation of Example IV is repeated, substituting for R acid an equimolar amount of Pyrazolone-T. The resulting product is substantially identical in color to the common food color, Orange B.

EXAMPLE IX

The preparation of Example II is repeated, substituting for Pyrazolone-T, an equimolar amount of 1,8-dihydroxynaphthalene-3,6-disulfonic acid. The resulting product is a burgundy polymeric dye.

COMPARATIVE EXPERIMENTS

An important feature of the products of this invention which renders the products' use as food colors most attractive is the nondegradability of the sulfonamido linkage. This is demonstrated as follows:

A. The product from Example II was incubated for 48 hrs at 50° at pH 0.1 and at pH 12.0. In neither case could any polymer breakdown or hydrolysis of the sulfonamido group be detected.

B. For comparison, small samples of dyes comparable to those produced in Example I were made with linkages not of sulfonamido groups but of (1) sulfonate groups and (2) carboxamido groups. These dyes were incubated as above. In 48 hrs, at either pH, the sulfonate groups were completely hydrolyzed and the carboxamido groups were more than 75% hydrolyzed.

We claim as our invention:

1. A nontoxic coloring composition having the formula

wherein M is a nondegradable, nondigestable organic polymer backbone having at least two carbon atoms and dimensions such that the coloring composition molecule has a molecular weight of at least 1,000 and is too large to pass through the mucosa of the gastrointestinal tract, K is an optically chromophoric group,

is a sulfonamido linkage attaching K to M wherein R is hydrogen or a hydrocarbon of up to and including 6 carbon atoms, said sulfonamido linkage being positioned with its NR group being separate from but attached to M and its $SO_2$ group being attached to K, and wherein Z is a positive integer.

2. The coloring composition of claim 1 wherein R is hydrogen and z has a value of from 10 to 5,000.

3. The coloring composition of claim 2 wherein K comprises an azo chromophore which exists as a sulfonate salt.

4. The coloring composition of claim 2 wherein K is

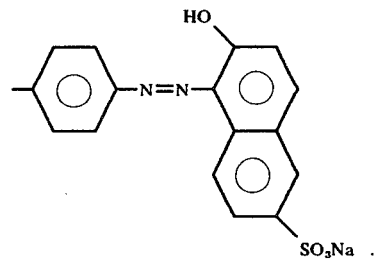

5. The coloring composition of claim 4 wherein M is polyethylene.

6. The coloring composition of claim 2 wherein K is

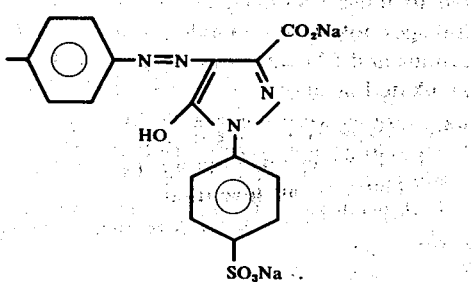
7. The coloring composition of claim 6 wherein M is polyethylene.
8. The coloring composition of claim 2 wherein K is
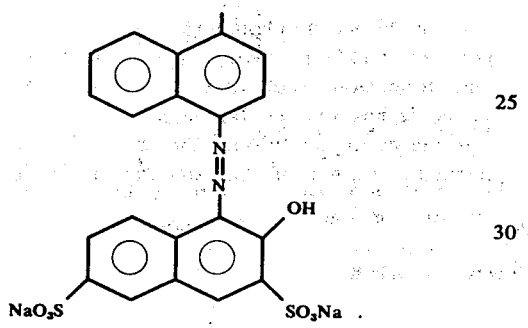
9. The coloring composition of claim 8 wherein M is polyethylene.
10. The coloring composition of claim 2 wherein K is
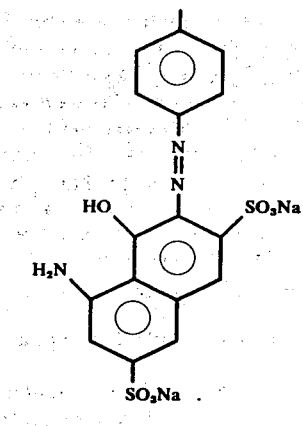
11. The coloring composition of claim 2 wherein K is
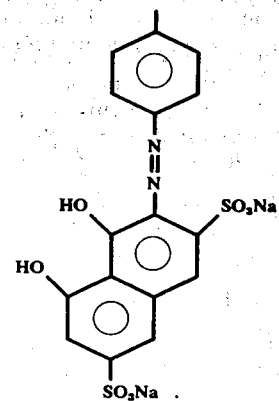
* * * * *